(12) United States Patent
Gay et al.

(10) Patent No.: US 6,651,309 B2
(45) Date of Patent: Nov. 25, 2003

(54) METHOD FOR FABRICATING A HIGHLY-DENSE POWDER IRON PRESSED STATOR CORE FOR USE IN ALTERNATING CURRENT GENERATORS AND ELECTRIC MOTORS

(75) Inventors: David Earl Gay, Pendleton, IN (US); David Allen Score, Shirley, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/795,201

(22) Filed: Feb. 27, 2001

(65) Prior Publication Data

US 2002/0117907 A1 Aug. 29, 2002

(51) Int. Cl.⁷ .................... H02K 15/00; H02K 15/02; H02K 15/10; H02K 15/14; H02K 15/16; H01R 43/06; H01R 43/10; H01F 7/06
(52) U.S. Cl. .................... 29/596; 29/597; 29/598; 29/605; 29/606
(58) Field of Search .............. 29/596–598, 605–606

(56) References Cited

U.S. PATENT DOCUMENTS

| | | | | |
|---|---|---|---|---|
| 3,255,512 A | * | 6/1966 | Lochner et al. .......... 29/155.56 |
| 3,325,760 A | * | 6/1967 | Bernard ...................... 335/281 |
| 3,708,706 A | * | 1/1973 | Akiyama et al. ............ 310/216 |
| 4,102,040 A | * | 7/1978 | Rich ............................ 29/598 |
| 4,211,944 A | * | 7/1980 | Haller ......................... 310/72 |
| 4,341,845 A | * | 7/1982 | Liebermann et al. ....... 428/592 |
| 4,388,371 A | * | 6/1983 | Bolon et al. ................ 428/383 |
| 4,445,353 A | * | 5/1984 | Taleff et al. ................. 72/136 |
| 4,492,884 A | * | 1/1985 | Asano et al. ................ 310/45 |
| 4,601,765 A | | 7/1986 | Soileau et al. .............. 148/104 |
| 4,613,780 A | * | 9/1986 | Fritzsche .................... 310/216 |
| 4,947,065 A | | 8/1990 | Ward et al. .................. 310/44 |
| 5,063,011 A | | 11/1991 | Rutz et al. .................. 264/126 |
| 5,198,137 A | | 3/1993 | Rutz et al. ................. 252/62.54 |
| 5,211,896 A | | 5/1993 | Ward et al. ................. 264/126 |
| 5,405,574 A | | 4/1995 | Chelluri et al. ............. 419/47 |
| 5,591,373 A | | 1/1997 | Ward et al. ............... 252/62.54 |
| 5,611,139 A | | 3/1997 | Chelluri et al. ............ 29/744 |
| 5,611,230 A | | 3/1997 | Chelluri et al. ............ 72/56 |
| 5,689,797 A | | 11/1997 | Chelluri et al. ............ 419/38 |
| 6,426,578 B1 | * | 7/2002 | Mori et al. ................. 310/214 |
| 6,470,563 B1 | * | 10/2002 | Asao et al. ................. 29/596 |
| 6,484,387 B1 | * | 11/2002 | Lee et al. ................... 29/596 |
| 6,504,284 B1 | * | 1/2003 | Kazama et al. ............ 310/259 |
| 6,550,130 B2 | * | 4/2003 | Itoh et al. .................. 29/596 |

* cited by examiner

Primary Examiner—Nestor Ramirez
Assistant Examiner—Pedro J. Cuevas
(74) Attorney, Agent, or Firm—Margaret A. Dobrowitsky

(57) ABSTRACT

A high-density stator core for use in electrodynamic devices is fabricated by the electromagnetic pressing of an iron-based powder coated with a dielectric material and methods for performing the electromagnetic pressing are disclosed. The stator core includes a yoke portion that may further include a plurality of integral poles extending either radially outward from an outer circumferential surface of the yoke portion or radially inward from an interior circumferential surface of the yoke portion. The stator core is formed as a near-net-shape compact by an electromagnetic pressing process and has an as-formed density of at least about 98% of the theoretical density.

34 Claims, 4 Drawing Sheets

METHOD FOR FABRICATING A HIGHLY-DENSE POWDER IRON PRESSED STATOR CORE FOR USE IN ALTERNATING CURRENT GENERATORS AND ELECTRIC MOTORS

FIELD OF THE INVENTION

This invention relates to stator assemblies for use in alternating current generators and electric motors, and more particularly, to a high-density stator core fabricated from an iron-based powder by electromagnetic pressing.

BACKGROUND OF THE INVENTION

Alternating current generators and electric motors typically incorporate a fixed stator assembly for inductively coupling electrical energy from an adjacent rotating component or rotor. A stator assembly incorporates a magnetic stator core fabricated traditionally from thin laminates of an iron-based material such as a silicon-iron alloy. Individual laminations are punched from flat sheets of the ferrous material using specialized dies with the required shape and number of slots and teeth. The individual laminations are coated with a thin insulating layer to reduce eddy current losses, carefully aligned in a stack, and secured to form a stator core. Conductors are wound in the slots to complete the stator assembly for incorporation into a generator or motor.

Stator cores have also been produced from an iron-based powder using conventional powder metallurgy techniques. A near-net shape, single piece green compact is produced by applying a large uniaxial pressure to compress a quantity of the powder that is dimensionally confined within a die. The die possesses a geometric shape with features that complement the desired features of the stator core. Stator cores formed from pure iron powder by conventional powder metallurgy techniques typically have a density of about 7.2 $g/cm^3$ to about 7.3 $g/cm^3$. An example of a stator core fabricated from an iron-based powder by conventional powder metallurgy techniques is disclosed in U.S. Pat. No. 4,947,065 issued to Ward et al.

Iron-based powder is a magnetic material that is subject to undesirable hysteresis losses and eddy current losses when it is exposed to a rapidly varying electromagnetic field. Thus, prior to compaction, the iron-based powder is coated with a dielectric material using one of a number of well known processes. The dielectric coating electrically insulates individual particles of iron to minimize core losses due to eddy currents and hysteresis. Such coatings include thermoplastics, such as disclosed in U.S. Pat. No. 5,211,896 issued to Ward et al., iron phosphates, such as disclosed in U.S. Pat. No. 5,063,011 issued to Rutz et al., and alkali metal silicates, such as disclosed in U.S. Pat. No. 4,601,765 issued to Soileau et al.

In conventional powder metallurgy techniques, the compact may be sintered after compacting to develop metallurgical bonds by mass transfer under the influence of heat. However, subsequent thermal treatment of coated iron powder degrades the electrical insulating properties of the dielectric coating, particularly for a thermoplastic coating, and produces a stator core having unsatisfactory magnetic properties.

Stator cores of coated iron powder compacted by traditional powder metallurgy techniques have magnetic properties significantly inferior to those of a stator core constructed from stacked laminations, especially for low-frequency applications. More specifically, a stator core formed of iron-based powder will generally have a lower flux capacity, a reduced permeability, and higher hysteresis losses than a comparable laminated stator core. The inferiority in magnetic properties, particularly the induction permeability, is believed to be due in part to the inability of traditional powder metallurgy techniques to sufficiently densify the particles of coated iron.

Conventional laminated stator cores require many different operations in their manufacture. Although compaction of metal powder to fabricate a stator core eliminates the need to punch and stack individual laminations, significant drawbacks limit the utility of a stator core formed from metal powder. The tooling and equipment, including a die and a very high tonnage press, required for conventional powder metallurgy techniques is costly and can only be justified by the prospect of large volume production. In addition, parts having a complex geometry and a large surface area are difficult to fabricate with uniform material properties. For example, in a conventional stator core design, the poles that project radially from a yoke portion are difficult to densify.

A lubricant may be admixed with the iron-based powder before compaction. The lubricant reduces friction during pressing, which improves the compressibility of the iron-based powder and the uniformity of densification throughout the body of the part. However, the admixed lubricant reduces the strength of the compact by forming a residual lubricant film between the metal particles.

Specialized powder metallurgy processes have emerged that can compact a metal powder to a density approaching full density, such as pneumatic forging, hot isostatic pressing, and powder forging. However, cores for ignition coils fabricated from coated iron powder by such techniques have exhibited unacceptably high core losses due to thermal breakdown of the dielectric coating.

There is thus a need for a high-density stator core produced as a near-net-shape part from an iron-based powder and that has improved magnetic properties optimized for use in an alternating current generator or electric motor.

SUMMARY OF THE INVENTION

The present invention addresses these and other problems associated with the prior art by providing a stator core structure fabricated as a highly-dense, near-net-shape component from an iron-based powder. Further, the present invention provides a stator core having enhanced magnetic properties suitable to replace laminated stator cores for use in dynamoelectric devices, such as alternating current generators and motors. Further, the present invention provides a stator core formed from an iron-based powder coated with a dielectric material, wherein the stator core has magnetic properties superior to stator cores fabricated from the same powder by conventional powder metallurgy techniques.

To this end, and in accordance with the principles of the present invention, there is provided a stator core having an annular yoke portion comprising a compacted iron-based powder having individual particles substantially isolated by a dielectric layer. The stator core may further include a plurality of integral poles that extend either radially outward from the exterior circumference of the yoke portion or radially inward from an interior circumference of the yoke portion. The stator cores are formed by electromagnetic pressing an iron-based powder coated with a dielectric material to a density of at least about 98% of the theoretical density.

These and other objects and advantages of the present invention shall become more apparent from the accompanying drawings and description thereof.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the principles of the invention.

DETAILED DESCRIPTION

Electromagnetic pressing is a technique for compressing a powderous or particulate material to create a very dense body. In a typical setup for accomplishing electromagnetic pressing, a coil is circumferentially disposed about the exterior of an electrically conductive container, which is filled with the material. When a large magnitude of electrical current is caused to flow in a switched pulse through the coil, magnetic pressure of a large magnitude is imparted to the container. The container is isostatically compressed radially inward and, as a result, the powder therein is very firmly compacted to create a rigid body. Electromagnetic pressing is disclosed, for example, in U.S. Pat. Nos. 5,689,797, 5,611,230, 5,611,139, and 5,405,574, each issued to Chelluri et al. The present invention applies the technique of electromagnetic pressing to the manufacture of high density stator cores which exhibit enhanced magnetic properties, such as low core losses.

Figure 1:
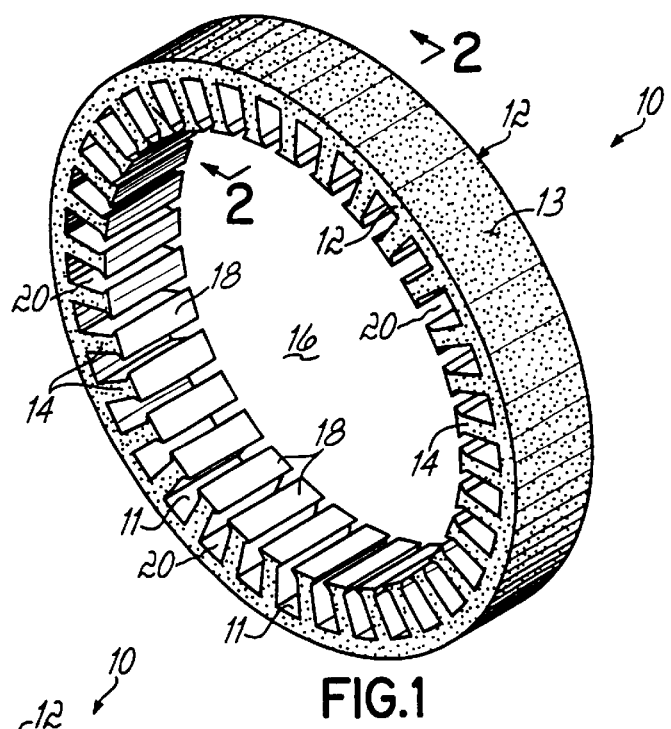
FIG. 1 is a perspective view of a stator core of the present invention.
Figure 2:
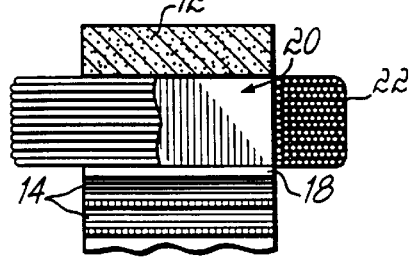
FIG. 2 is a cross-sectional view of the stator core shown in FIG. 1 taken along line 2—2.

Referring now to the drawings, FIGS. 1 and 2 depict a stator core 10 having a yoke portion 12 that is generally annular and including an interior circumferential surface 11 and an exterior circumferential surface 13. A plurality of poles 14 are provided that extend substantially radially inwardly from the interior circumferential surface 11 of the yoke portion 12 toward the center of an inner bore 16. The poles 14 are integral and generally coplanar with the yoke portion 12 and are spaced in substantially equal intervals about the interior circumferential surface 11. The inner face of each pole 14 advantageously has a flared lip 18. It should be understood, however, that lip 18 may be omitted from one or more of the poles 14 without departing from the spirit and scope of the present invention. A slot 20 is defined in the space between each of respective adjacent poles 14.

Referring to FIG. 2, each slot 20 receives one or more conductors or windings 22 that are wound about the circumference of the stator core 10 in an operable configuration. A flared lip 18 is provided to assist in retaining the windings within slot 20. Only a portion of a stator assembly is shown in FIG. 2, but it is to be understood that all of the slots 20 contain the conductors or windings 22. Windings 22 are wound about the circumference of the yoke portion 12 and affixed thereto by methods familiar to one of ordinary skill in the art of dynamoelectric devices, such as winding machines manufactured by Globe Products, Inc. (Dayton, Ohio).

In typical electrodynamic devices such as an alternating current generator or an electric motor, the stator core 10 of FIG. 1 is affixed within a generally cylindrical casing (not shown). An inner rotor (not shown) is coaxially disposed within the inner bore 16 and is rotatably supported by the casing. The rotor is operable to interact with a magnetic field produced in an air gap between the outer periphery of the rotor and the poles 14 of the stator core 10.

Figure 3:
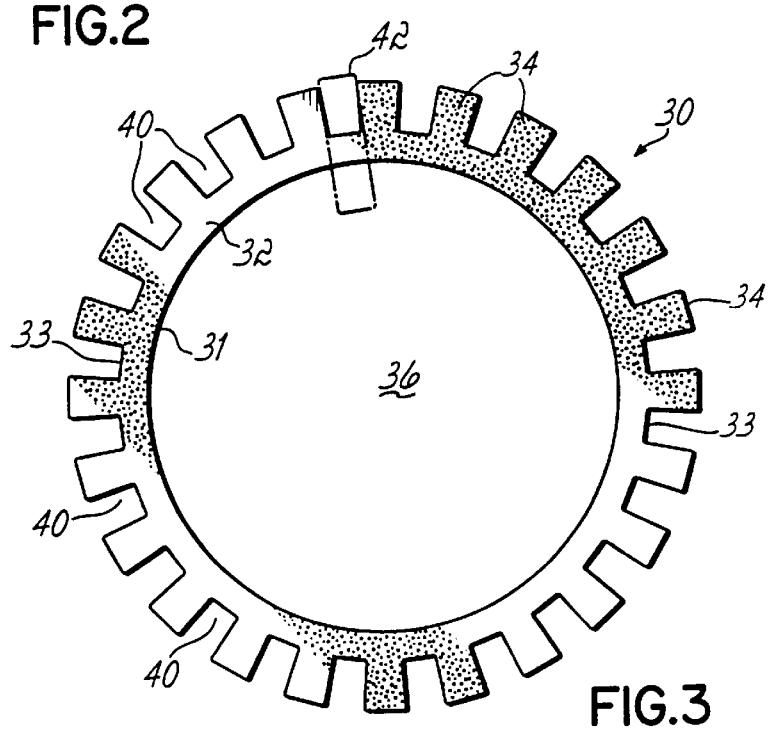
FIG. 3 is a side view of an alternative embodiment of a stator core of the present invention.

Referring to FIG. 3, in accordance with the present invention, an alternative embodiment of a stator core 30 has a yoke portion 32 that is generally annular and includes an interior circumferential surface 31 and an exterior circumferential surface 33. A plurality of poles 34 extend radially outward from the exterior circumferential surface 33 of the yoke portion 32 and radially away from the center of an inner bore 36. The poles 34 are integral and generally coplanar with the yoke portion 32 and are spaced in substantially equal intervals about the exterior circumferential surface 33. A slot 40 for receiving one or more windings 42 (diagrammatically shown in phantom) is defined in the space between each of respective adjacent poles 34. In a typical alternating current generator or electric motor, an outer rotor (not shown) is disposed about the exterior circumferential surface 33 of the stator core 30 and is rotatably supported by a casing (not shown). The rotor is operable to interact with a magnetic field produced in an air gap between the inner periphery of the rotor and the poles 34 of the stator core 30.

Figure 4:
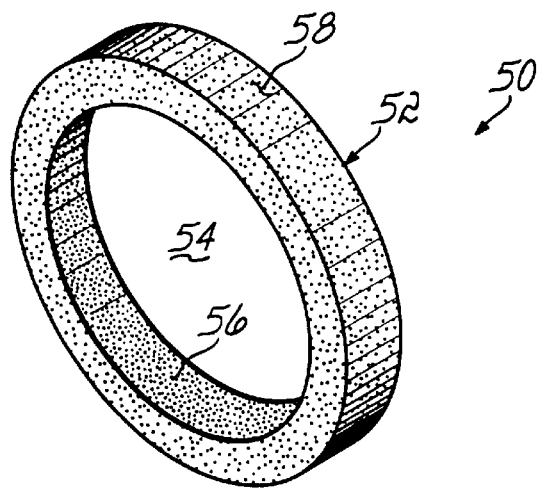
FIG. 4 is a perspective view of another alternative embodiment of a stator core of the present invention.

Referring to FIG. 4, in accordance with the present invention, an alternative embodiment of a stator core 50 comprises an annular yoke portion 52 surrounding an inner bore 54 and having an interior circumferential surface 56 and an exterior circumferential surface 58. In this embodiment, the stator core 50 is a slotless design in that the yoke portion 52 lacks integral poles and slots. Windings (not shown) are provided about the circumference of the yoke portion 52 and either an inner or outer rotor (not shown) is coaxially provided about either the interior circumferential surface 56 or the exterior circumferential surface 58, respectively, of yoke portion 52.

Each stator core 10, 30, 50 is formed as a one-piece part molded to the general shape shown in FIGS. 1, 3 and 4, respectively, and is comprised of aggregated particles of a high-purity iron-based powder. The iron-based powder must be highly compressible and preferably has a composition engineered for soft magnetic powder metallurgy applications, such as a pure iron or high purity iron alloy. Pure iron is a soft magnetic material having a high permeability, a high induced magnetization, and a low coercive force. A soft magnetic material is defined as a magnetic material that can be reversibly magnetized at relatively low magnetic fields.

Substantially pure iron-based powders that can be used in the invention are powders of iron containing not more than about 1.0 weight percent, preferably no more than about 0.5 weight percent, of normal impurities. Examples of such highly compressible, metallurgical-grade iron powders are Ancorsteel 1000C iron powder available from Hoeganaes Corporation, Riverton, N.J. and Atomet® 1001HP iron powder available from Quebec Metal Powders, Ltd., Montreal, Canada. By way of specific example, Ancorsteel 1000C iron powder has typical sieve fractions, based on a U.S. standard sieve classification according to particle size, of about 13% by weight of particles smaller than a No. 325 sieve and about 17% by weight of particles larger than a No. 100 sieve (trace amounts larger than a No. 60 sieve) with the remaining particles between these two sizes. The Ancorsteel 1000C powder has an uncompacted apparent density of about 2.92 g/cm$^3$. For conventional uniaxial pressing, a typical single-pressed green density for the Ancorsteel 1000C powder ranges from about 6.9 g/cm$^3$ at a compaction pressure of about 30 tons/in$^2$ to about 7.3 g/cm$^3$ at a compaction pressure of about 50 tons/in$^2$.

Other pre-alloyed iron-based powders may be used in the invention. By way of example and not limitation, the ferrous alloy powder may be an iron-silicon alloy containing about 3 weight percent silicon, balance iron; an iron-nickel alloy containing about 20 to about 50 weight percent nickel, balance iron; and an iron-cobalt alloy containing about 49 weight percent cobalt, about 2 weight percent vanadium, balance iron. However, it will be appreciated that a pure iron powder generally has a superior compressibility compared to such iron-based alloy powders.

Prior to a compaction operation, the individual particles of iron-based powder are encapsulated within a coating of a dielectric material. The coating of dielectric material insulates adjacent particles of powder so as to reduce core loses. Suitable dielectrics include, but are not limited to, organic materials such as thermoplastics, or thermosets, or an inorganic material such as an iron oxide, an iron phosphate, an alkali silicate, or a magnesium oxide. A suitable thermoplastic is a polyetherimide, polyethersulfone, or polyamideimide, and is applied as a coating to the iron particles. Exemplary commercial thermosets include the family of Durez phenolic compounds available from Occidental Chemical Corporation (Dallas, Tex.), such as Durez 4400. A coating of iron oxide or iron phosphate may be applied on the surface of the particles by a chemical reaction. An alkali silicate coating may be applied by wetting the powder with a sodium silicate or potassium silicate solution. A coating of magnesium oxide may be applied by the thermal conversion of a layer of a magnesium-based organometallic compound, or an organomagnesium compound, such as magnesium methylate. The dielectric material is associated with the powder particles by any one of various methods familiar to one of ordinary skill in the art. A review of techniques for electrically insulating the iron-based particles with coatings is presented in U.S. Pat. Nos. 5,211,896 and 5,591,373, each issued to Ward et al. The disclosure of each patent is hereby incorporated by reference herein in its entirety.

It may be further understood that multiple coatings of diverse dielectrics, such as ones chosen from among the dielectrics enumerated above, may be applied to the iron-based particles. For example, an iron phosphate layer may be combined with a subjacent coating of thermoplastic, as disclosed in U.S. Pat. No. 5,198,137 issued to Rutz et al., or doubly-coated iron particles may have an alkali metal silicate overcoated with a thermoplastic, as disclosed in U.S. Pat. No. 4,601,765 issued to Soileau et al.

Figure 5A:
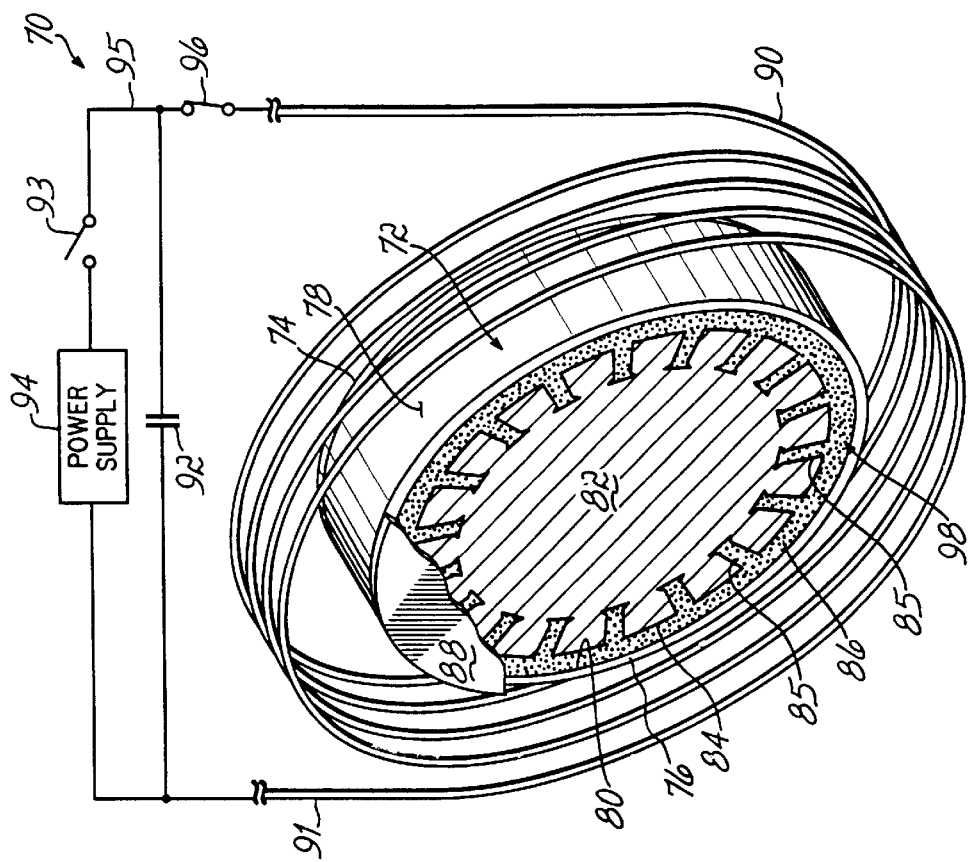
FIG. 5A is a diagrammatic representation of a device for performing electromagnetic pressing.

Referring to FIG. 5A, an apparatus 70 is diagrammatically illustrated for performing an electromagnetic pressing operation, according to the principles of the present invention. The apparatus 70 includes an electrically-conductive container 72 having a closed end 74, an opposed open end 76, an exterior circumferential surface 78, and an interior circumferential surface 80. Interior circumferential surface 80 is provided with surface features that are complementary to the desired surface features to be fabricated adjacent an exterior circumferential surface of a stator core. In this particular embodiment, for example, the interior circumferential surface 80 of container 72 has a smooth substantially cylindrical wall that is complementary to the exterior circumferential surface 13 of stator core 10 depicted in FIG. 1. A mandrel 82 is coaxially positioned along a longitudinal axis of container 72. The mandrel 82 comprises a material that will not compress significantly during the compaction process, such as a hardened tool steel. Mandrel 82 has an exterior circumferential surface, generally indicated at 84, with surface features that are complementary to the desired surface features to be fabricated adjacent an interior circumferential surface of a stator core. In this particular embodiment, for example, a spaced arrangement of notches 85 is superimposed on the exterior circumferential surface 84 of mandrel 82 that are complementary to the poles 14 and slots 20 of stator core 10 depicted in FIG. 1. The space defined between the interior circumferential surface 80 of the container 72 and the exterior circumferential surface 84 of the mandrel 82 is filled with an iron-based powder 86 coated with a dielectric material. An electrically-conductive cap 88 is provided to cover and seal the open end 76 of container 72.

A coil 90 of an electrically-conductive material is circumferentially disposed in a surrounding, helical configuration about the exterior circumferential surface 78 of the container 72. The coil 90 is advantageously carried by an immovable member (not shown) so that coil 90 remains substantially transfixed during the electromagnetic pressing operation. Coil 90 is operably connected via transmission line 91 to one or more high-voltage capacitor banks 92, interconnected in series, which may be charged via transmission line 95 by closing a switch 93 to form a closed circuit with a high-voltage power supply 94. After capacitor banks 92 are charged, switch 93 is opened. When a switch 96 is closed, a switched pulse of a high electrical current is transferred from the capacitor banks 92 via line 91 to the coil 90. The pulse rise time is typically less than one millisecond, preferably on the order of 80 microseconds. The high current pulse in coil 90 creates an extremely large magnetic field in the space between the exterior circumferential surface 78 of the container 72 and the coil 90. The magnetic field ranges between about 1 to about 200 Oersted, preferably about 50 to about 200 Oersted. Eddy currents, which are induced in the electrically-conductive container 72 due to electrons circulated by the magnetic field of the coil 90, create a counteracting magnetic field of an opposite polarity to that of the magnetic field produced by the coil 90. The interaction between the magnetic field produced by eddy currents in the container 72 and the magnetic field provided by the coil 90 results in a strong magnetic repulsion between the coil 90 and the container 72.

Figure 5B:
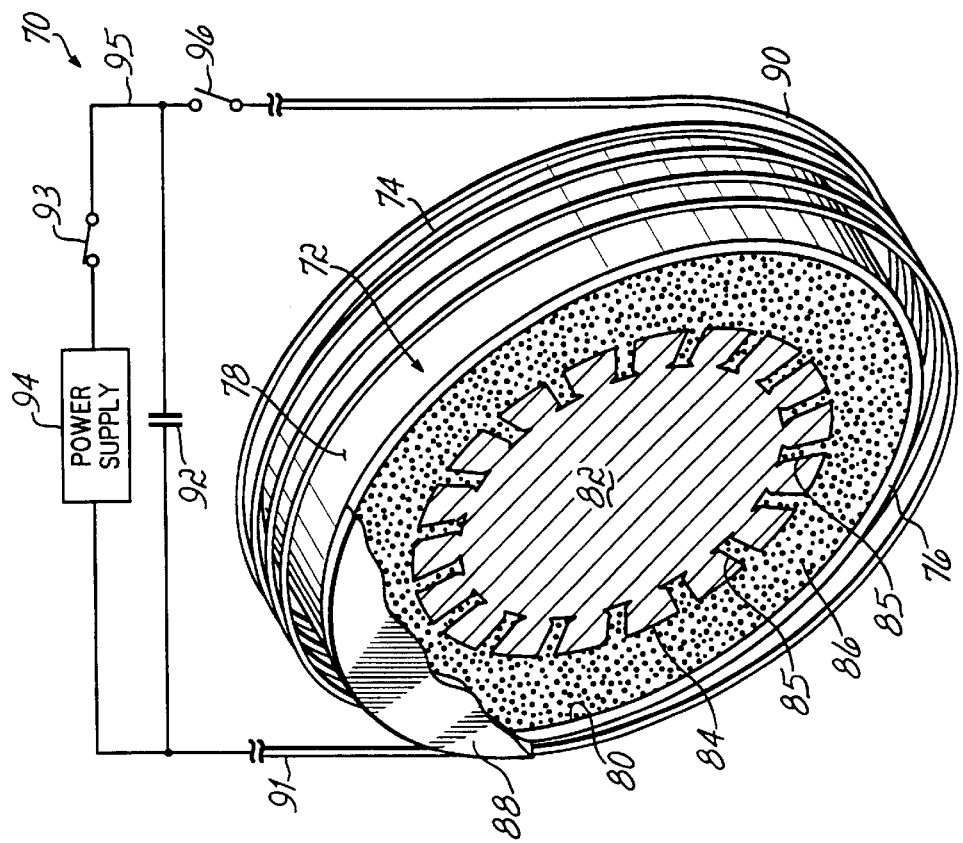
FIG. 5B is a diagrammatic representation of the device shown in FIG. 5A, following a electromagnetic pressing operation.

Referring to FIG. 5B, in which like parts have like numerals to that depicted in FIG. 5A, the magnetic repulsion between container 72 and coil 90 isostatically compresses the container 72. As the container 72 compresses, the coated iron-based powder 86 is isostatically compressed between the interior circumferential surface 80 of container 72 and the exterior circumferential surface 84 of mandrel 82. Following an electromagnetic pressing operation, the mandrel 82 and the container 72 are removed to expose a near-net shape stator core 98 of compacted powder 86, having a density of at least about 98% of the theoretical density, wherein the individual particles have a substantially intact coating of dielectric material.

Figure 6:
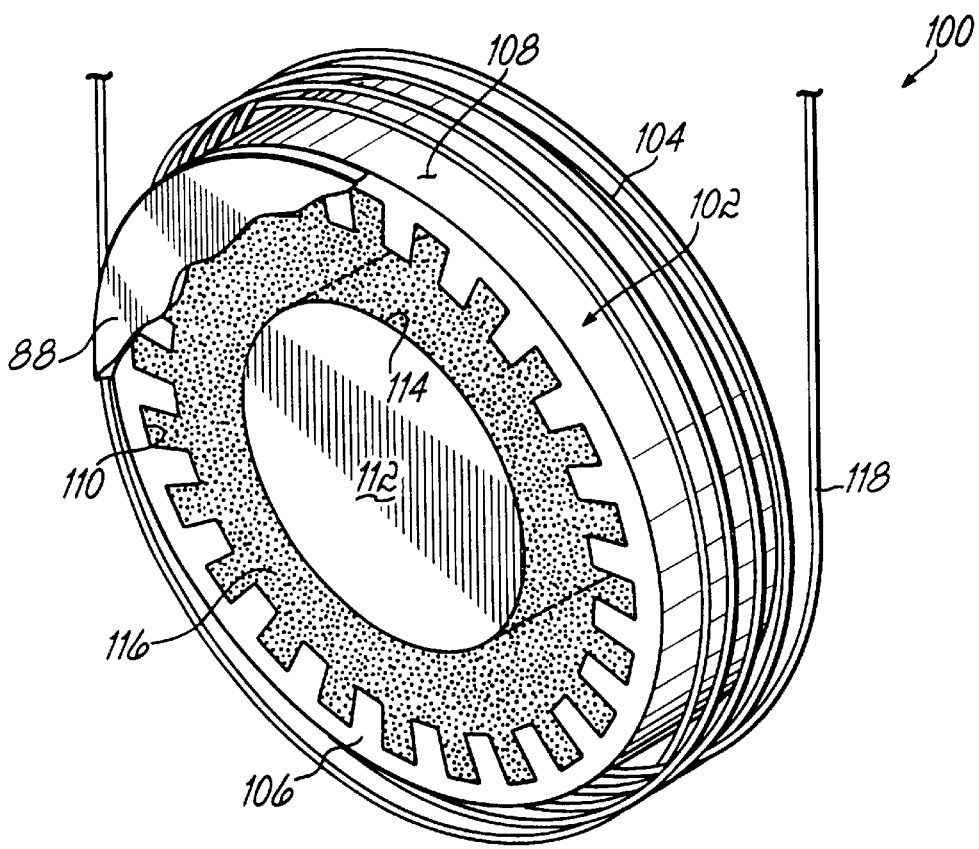
FIG. 6 is a diagrammatic representation of an alternative configuration of the device shown in FIG. 5A.

Referring to FIG. 6, an apparatus 100 is diagrammatically illustrated for performing an electromagnetic pressing operation to form stator cores according to an alternative embodiment of the present invention. The apparatus 100 includes an electrically-conductive container 102 having a closed end 104, an opposed open end 106, an exterior circumferential surface 108, and an interior circumferential surface 110. Interior circumferential surface 110 is provided with surface features that are complementary to the desired surface features to be fabricated adjacent an exterior circumferential surface of a stator core. In this particular embodiment, for example, a spaced arrangement of notches is superimposed on the interior circumferential surface 110 of container 102 that are complementary to the poles 34 and slots 40 of stator core 30 depicted in FIG. 3. A mandrel 112 is coaxially positioned along a longitudinal axis of container 102. The mandrel 112 comprises a material that will not compress significantly during the compaction process, such as a hardened tool steel. Mandrel 112 has an exterior circumferential surface 114 with surface features that are complementary to the desired surface features to be fabricated adjacent an interior circumferential surface of a stator core. In this particular embodiment, for example, the exterior circumferential surface 114 of mandrel 112, has surface features that are complementary to the interior circumferential surface 31 of stator core 30 depicted in FIG. 3.

The space defined between the interior circumferential surface 110 of the container 102 and the exterior circumferential surface 114 of the mandrel 112 is filled with an iron-based powder 116 coated with a dielectric material. A coil 118 of an electrically-conductive material is circumferentially disposed about exterior circumferential surface 108 of container 102 in a manner as described with respect to FIG. 5A. A stator core (not shown but substantially similar to stator core 30 depicted in FIG. 3) is produced by an electromagnetic pressing operation. The electromagnetic pressing operation is accomplished by similar components and a similar method as described above with reference to FIGS. 5A and 5B in which coil 90 is energized with a high current pulse of electrical energy.

Figure 7:
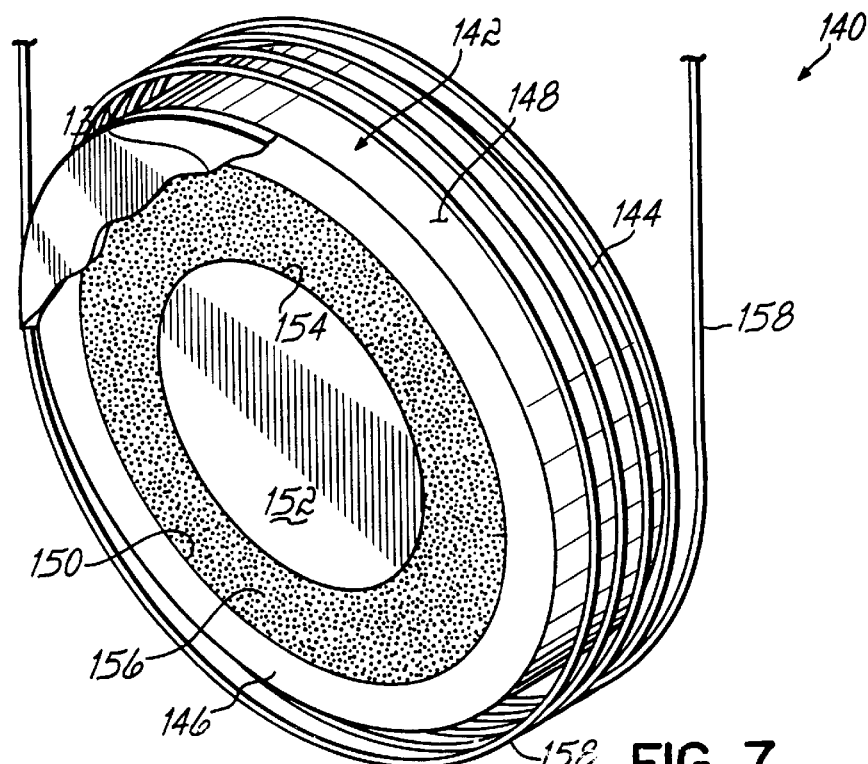
FIG. 7 is a diagrammatic representation of another alternative configuration of the device shown in FIG. 5A.

Referring to FIG. 7, an apparatus 140 is diagrammatically illustrated for performing an electromagnetic pressing operation to form stator cores according to another alternative embodiment of the present invention. The apparatus 140 includes an electrically-conductive container 142 having a closed end 144, an opposed open end 146, an exterior circumferential surface 148, and an interior circumferential surface 150. In this particular embodiment, the interior circumferential surface 150 of container 142 has a smooth circular contour that is complementary to exterior circumferential surface 58 of stator core 50 depicted in FIG. 4. A mandrel 152 is coaxially positioned along a longitudinal axis of container 142. Mandrel 152 comprises a material that will not compress significantly during the compaction process, such as a hardened tool steel. Mandrel 152 has an exterior circumferential surface 154 that is complementary to the interior circumferential surface 56 of stator core 50 depicted in FIG. 4.

To perform an electromagnetic pressing operation, the space defined between the interior circumferential surface 150 of the container 142 and the exterior circumferential surface 154 of the mandrel 152 is filled with an iron-based powder 156 coated with a dielectric material. A coil 158 of an electrically-conductive material is circumferentially disposed about exterior circumferential surface 148 of container 142 in a manner as described with respect to FIG. 5A. A stator core (not shown but substantially similar to stator core 50 depicted in FIG. 4) is produced by the electromagnetic pressing operation, which is accomplished by similar components and a similar method as described above with reference to FIGS. 5A and 5B in which coil 90 is energized with a high current pulse of electrical energy.

Figure 8:
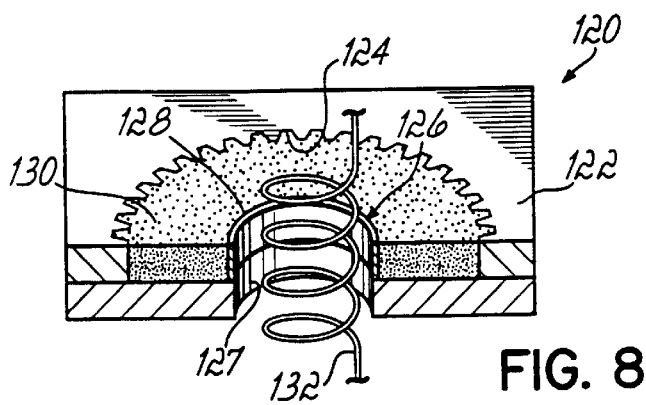
FIG. 8 is a diagrammatic representation of a device for performing electromagnetic pressing.

Referring to FIG. 8, in another alternative embodiment according to the principles of the present invention, an apparatus 120 is diagrammatically illustrated for performing an electromagnetic pressing operation. Apparatus 120 includes a die 122 having an interior circumferential surface 124 with surface features complementary to the desired surface features of the stator core to be formed. In this embodiment, the interior circumferential surface 124 of die 122 has a plurality of superimposed notches extending radially and integrally from the interior circumferential surface 124 that are complementary to the pole and space configuration of stator core 30 depicted in FIG. 3. Die 122 is disposed generally coaxially around an electrically-conductive ring 126 in a surrounding fashion. Ring 126 has an interior circumferential surface 127 and an exterior circumferential surface 128 having surface features complementary to desired surface features of a stator core to be formed. In this embodiment, the exterior circumferential surface 128 of ring 126 has a smooth surface that is complementary to the interior circumferential surface 31 of stator core 30 depicted in FIG. 3.

To perform an electromagnetic pressing operation, the space between the interior circumferential surface 124 of die 122 and the exterior circumferential surface 128 of ring 126 is filled with an iron-based powder 130 coated with a dielectric material, and a cap (not shown) is installed to confine the powder 130 within the die 122. A helical coil 132 of an electrically-conductive material is disposed adjacent the interior circumferential surface 127 of the cylindrical ring 126. Coil 132 is advantageously transfixed to an immovable member (not shown) so that coil 132 remains stationary during an electromagnetic pressing operation. Coil 132 is energized by a current pulse from one or more charged capacitor banks (not shown but similar to capacitor banks 92 in FIG. 5A). The magnetic field of the coil 132 induces, as explained above, a secondary magnetic field in the ring 126 opposed to the magnetic field of the coil 132. The strong repulsive force dues to the opposed magnetic fields isostatically compresses the ring 126 radially outward. Die 122 is immovable and constrains the outward expansion of the powder 130 during the electromagnetic pressing operation. The powder 130 is confined between the exterior circumferential surface 128 of the ring 126 and the interior circumferential surface 124 of the die 122, such that the powder 130 is likewise isostatically compressed so as to achieve a density of about 98% of the theoretical density.

Figure 9:
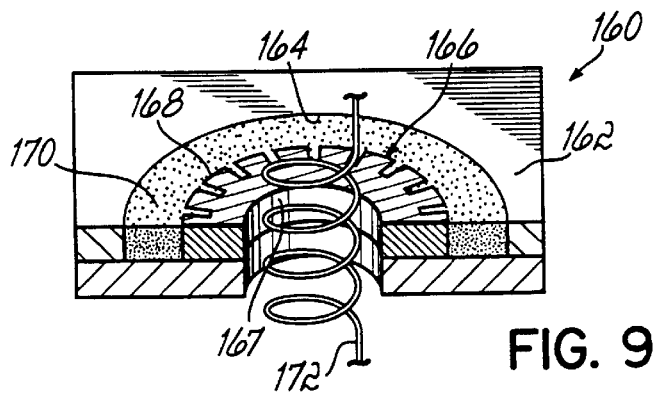
FIG. 9 is a diagrammatic representation of an alternative configuration of the device shown in FIG. 8.

Referring to FIG. 9, in another alternative embodiment according to the principles of the present invention, an apparatus 160 is diagrammatically illustrated for performing an electromagnetic pressing operation. Apparatus 160 includes a die 162 having an interior circumferential surface 164 with surface features complementary to the desired surface features of the stator core to be formed. In this embodiment, the interior circumferential surface 164 of die 162 has a smooth curvilinear contour that is complementary to the exterior circumferential surface 13 of stator core 10 depicted in FIG. 1. Die 162 is disposed generally coaxially around an electrically-conductive ring 166 in a surrounding fashion. Ring 166 has an interior circumferential surface 167 and an exterior circumferential surface 168 having a plurality of superimposed notches extending radially and integrally from an interior cylindrical surface that is complementary to the pole and space configuration of the interior circumferential surface 11 of stator core 10 depicted in FIG. 1.

To perform an electromagnetic pressing operation, the space defined between the exterior circumferential surface 168 of the ring 166 and the interior circumferential surface 164 of the die 162 is filled with an iron-based powder 170 coated with a dielectric material. A coil 172 of an electrically-conductive material is adjacent the interior circumferential surface 167 of the ring 166 in a manner as described with respect to FIG. 8. A stator core (not shown but substantially similar to stator core 10 depicted in FIG. 1) is produced by the electromagnetic pressing operation, which is accomplished by similar components and a similar method as described above with reference to FIG. 8 in which coil 132 is energized with a high current pulse of electrical energy.

Densities of stator cores produced in accordance with the principles of the present invention were measured by Archimedes-type determinations in which the mass is derived from weight measured by a scale and the volume from the volume of fluid displaced. For a pure iron powder, the resulting stator core has a nominal density preferably greater than about 7.6 g/cm$^3$. A typical density was measured to be between about 7.65 g/cm$^3$ and about 7.7 g/cm$^3$, which exceeds 98% theoretical 7.75 g/cm$^3$ density of elemental iron and additives.

Stator cores formed by electromagnetic pressing have densities that are significantly greater than comparable densities of stator cores formed by conventional powder metallurgy techniques. As the density of the stator core increases, magnetic properties such as permeability and saturation induction increase significantly. Moreover, the high density stator core formed by the rapid and relatively low temperature electromagnetic pressing operation retains the interparticle insulation provided by the dielectric, which is essential for acceptable magnetic properties. Therefore, the stator core compacted from metal powder by electromagnetic pressing will have a higher output than a comparable stator core compacted by a conventional powder metallurgy technique. In fact, the output for the metal powder stator is comparable to the output of a stator constructed from stacked laminations. Compared with the multiple steps required to fabricate a stator core from laminations, electromagnetic pressing advantageously produces a near-net shape part necessitating little or no additional machining to adjust dimensional tolerances.

Electromagnetic pressing significantly reduces the equipment and tooling costs compared with the comparable expenditures required to compact powder metal by conventional powder metallurgy techniques. Another advantage of electromagnetic pressing over conventional pressing is that a lubricant is not required to reduce friction during compaction and, therefore, will not be present in the compact so as to adversely impact material properties. Unlike conventional powder metallurgy techniques, an electromagnetic pressing apparatus features no moving parts, reduced friction, and reduced heat production. Moreover, electromagnetic pressing provides isostatic compaction, compared with the typical uniaxial pressures exerted by the high tonnage presses used in most conventional powder metallurgy techniques.

Electromagnetic pressing is compliant with significantly higher production rates, as compared with a high tonnage press, due to the rapid cycle time between sequential compactions. Further, when compared with the high tonnage press, the apparatus for electromagnetic pressing has a relatively small physical size and a significantly reduced noise output. As a result, less floorspace is required and associated fabrication processes, such as winding operations, can be located nearby for a lean manufacturing environment.

While the present invention has been illustrated by the description of embodiments thereof, and while the embodiments have been described in considerable detail, they are not intended to restrict or in any way limit the scope of the appended claims to such detail. Additional advantages and modifications will readily appear to those skilled in the art. For example, a component of an iron-based powder densified by electromagnetic pressing to have significantly improved magnetic properties and density is not limited to a stator core for use in a motor or generator, but may be widely applied in diverse electrodynamic devices. The invention in its broader aspects is therefore not limited to the specific details, representative apparatus and method and illustrative examples shown and described. Accordingly, departures may be made from such details without departing from the scope or spirit of applicant's general inventive concept.

What is claimed is:

1. A method for fabricating a highly-dense stator core for use in alternating current generators and electric motors, said method comprising:

provide an electrically conductive container having an exterior circumferential surface, an interior circumferential surface, and a longitudinal axis;

positioning a mandrel having an exterior circumferential surface coaxially within an interior of the container, wherein the interior circumferential surface of the container and the exterior circumferential surface of the mandrel have surface features complementary to desired surface features of the stator core;

filling the space defined between the interior circumferential surface of the container and the exterior circumferential surface of the mandrel with a iron-based powder coated with a dielectric material;

disposing a helical coil of a conductor circumferentially about the exterior circumferential surface of the container; and producing a magnetic force on the container to isostatically compress the container radially inward thereby isostatically compressing the iron-based powder between the interior circumferential surface of the container and the exterior circumferential surface of the mandrel to achieve a compressed powder having a density of at least about 98% of the theoretical density, wherein the magnetic force is produced by energizing the helical coil with a high current pulse of electrical power.

2. The method of claim 1, wherein the iron-based powder comprises less than about 1 weight percent impurities.

3. The method of claim 2, wherein the density of the compressed powder is between about 7.6 grams per cubic centimeter and about 7.75 grams per cubic centimeter.

4. The method of claim 1, wherein the mandrel is a cylindrical member comprising a tool steel.

5. The method of claim 1, wherein the mandrel is a generally cylindrical member and the exterior circumferential surface includes superimposed notches extending radially and integrally therefrom, said notches being complementary to a desired pole and slot profile on an interior circumferential surface of the stator core.

6. The method of claim 1, wherein the container is a generally cylindrical member and the interior circumferential surface includes superimposed notches extending radially and integrally therefrom, said notches being complementary to a desired pole and slot profile on an exterior circumferential surface of the stator core.

7. The method of claim 1, wherein the iron-based powder comprises an alloy of iron and a metal selected from the group consisting of silicon, nickel, vanadium, cobalt and combinations thereof, and wherein the alloy comprises less than about 1 weight percent impurities.

8. The method of claim 1, wherein the dielectric material is selected from the group consisting of thermoplastics, thermosets, iron oxides, iron phosphates, alkali silicates, magnesium oxides and combinations thereof.

9. A method for fabricating a highly-dense stator core for use in alternating current generators and electric motors, said method comprising:

provided an electrically conductive ring having an exterior circumferential surface, an interior circumferential surface, and a longitudinal axis;

positioning a die having an interior circumferential surface coaxially around an exterior of the ring, wherein the exterior circumferential surface of the ring and the interior circumferential surface of the die have surface features complementary to desired surface features of the stator core;

filling the space defined between the exterior circumferential surface of the ring and the interior circumferential surface of the die with a iron-based powder coated with a dielectric material;

disposing a helical coil of a conductor coaxially adjacent the interior circumferential surface of the ring; and producing a magnetic force on the ring to isostatically compress the ring radially outward thereby isostatically compressing the iron-based powder between the exterior circumferential surface of the ring and the interior circumferential surface of the die to achieve a compressed powder having a density of at least about 98% of the theoretical density, wherein the magnetic force is produced by energizing the helical coil with a high current pulse of electrical power.

10. The method of claim 9, wherein the iron-based powder comprises less than about 1 weight percent impurities.

11. The method of claim 9, wherein the density of the compressed powder is between about 7.6 grams per cubic centimeter and about 7.75 grams per cubic centimeter.

12. The method of claim 9, wherein the die is a cylindrical member comprising a tool steel.

13. The method of claim 9, wherein the die is a generally cylindrical member and the interior circumferential surface of the die includes a plurality of superimposed notches extending radially and integrally therefrom, said notches being complementary to a desired pole and slot profile on an exterior circumferential surface of the stator core.

14. The method of claim 9, wherein the ring is a generally cylindrical member and the exterior circumferential surface of the ring includes a plurality of superimposed notches extending radially and integrally therefrom, said notches being complementary to a desired pole and slot profile on an interior circumferential surface of the stator core.

15. The method of claim 9, wherein the iron-based powder comprises an alloy of iron and a metal selected from the group consisting of silicon, nickel, vanadium, cobalt and combinations thereof, and wherein the alloy comprises less than about 1 weight percent impurities.

16. The method of claim 9, wherein the dielectric material is selected from the group consisting of thermoplastics, iron oxides, iron phosphates, alkali silicates, magnesium oxides and combinations thereof.

17. A stator core comprising a compacted iron-based powder having individual particles substantially electrically isolated by a dielectric material and having a density of between about 7.6 grams per cubic centimeter and about 7.75 grams per cubic centimeter, wherein said core is prepared by the method as defined in claim 9.

18. The stator core of claim 17, wherein the iron-based powder comprises less than about 1 weight percent impurities.

19. The stator core of claim 17, wherein the dielectric material is selected from the group consisting of thermoplastics, iron oxides, iron phosphates, alkali silicates, magnesium oxides and combinations thereof.

20. A stator core comprising a compacted iron-based powder having individual particles substantially electrically isolated by a dielectric material and having a density of between about 7.6 grams per cubic centimeter and about 7.75 grams per cubic centimeter, wherein said core is prepared by the method as defined in claim 13.

21. A stator core comprising a compacted iron-based powder having individual particles substantially electrically isolated by a dielectric material and having a density of between about 7.6 grams per cubic centimeter and about 7.75 grams per cubic centimeter, wherein said core is prepared by the method as defined in claim 14.

22. A method for fabricating a highly-dense, annular stator core for use in alternating current generators and electric motors, the stator core having opposite inner and outer circumferential surfaces, said method comprising:

providing an electrically conductive member having a circumferential surface and a longitudinal axis;

positioning a non-movable member in a coaxial relationship with the electrically conductive member, the non-movable member having a circumferential surface concentric with the circumferential surface of the electrically conductive member;

filling the space defined between the circumferential surface of the electrically conductive member and the circumferential surface of the non-movable member with a iron-based powder coated with a dielectric material;

disposing a helical coil of a conductor coaxially adjacent the circumferential surface of the electrically conductive member; and producing a magnetic force by energizing the helical coil with a high current pulse of electrical power, the magnetic force isostatically compressing the electrically conductive member in a radial direction thereby isostatically compressing the iron-based powder between the circumferential surface of the non-movable member and the circumferential surface of the electrically conductive member to achieve a compressed powder having a density of at least about 98% of the theoretical density.

23. The method of claim 22, wherein the iron-based powder comprises less than about 1 weight percent impurities.

24. The method of claim 23, wherein the density of the compressed powder is between about 7.6 grams per cubic centimeter and about 7.75 grams per cubic centimeter.

25. The method of claim 22, wherein the non-movable member is a cylindrical member comprising a tool steel.

26. The method of claim 25, wherein the circumferential surface of the non-movable member includes a plurality of radially-extending notches, the notches being complementary to a desired pole and slot profile on a circumferential surface of the stator core.

27. The method of claim 22, wherein the circumferential surface of the electrically conductive member includes a plurality of radially-extending notches, the notches being complementary to a desired pole and slot profile on a circumferential surface of the stator core.

28. The method of claim 22, wherein the iron-based powder comprises an alloy of iron and a metal selected from the group consisting of silicon, nickel, vanadium, cobalt and combinations thereof, and wherein the alloy comprises less than about 1 weight percent impurities.

29. The method of claim 22, wherein the dielectric material is selected from the group consisting of thermoplastics, thermosets, iron oxides, iron phosphates, alkali silicates, magnesium oxides and combinations thereof.

30. A stator core comprising a compacted iron-based powder having individual particles substantially electrically isolated by a dielectric material and having a density of between about 7.6 grams per cubic centimeter and about 7.75 grams per cubic centimeter, wherein said core is prepared by the method as defined in claim 22.

31. The stator core of claim 30, wherein the iron-based powder comprises less than about 1 weight percent impurities.

32. The stator core of claim 30, wherein the dielectric material is selected from the group of thermoplastics, thermosets, iron oxides, iron phosphates, alkali silicates, magnesium oxides and combinations thereof.

33. A stator core comprising a compacted iron-based powder having individual particles substantially electrically isolated by a dielectric material and having a density of between about 7.6 grams per cubic centimeter and about 7.75 grams per cubic centimeter, wherein said core is prepared by the method as defined in claim 26.

34. A stator core comprising a compacted iron-based powder having individual particles substantially electrically isolated by a dielectric material and having a density of between about 7.6 grams per cubic centimeter and about 7.75 grams per cubic centimeter, wherein said core is prepared by the method as defined in claim 27.

* * * * *